(12) United States Patent
Cuddeback

(10) Patent No.: US 8,974,128 B2
(45) Date of Patent: Mar. 10, 2015

(54) RETAINING CLIP FOR CAMERA MOUNTING BRACKET

(71) Applicant: Non Typical, Inc., Green Bay, WI (US)

(72) Inventor: Mark Cuddeback, Green Bay, WI (US)

(73) Assignee: Non Typical Inc., Park Falls, WI (US)

( * ) Notice: Subject to any disclaimer, the term of this patent is extended or adjusted under 35 U.S.C. 154(b) by 0 days.

(21) Appl. No.: 14/056,290

(22) Filed: Oct. 17, 2013

(65) Prior Publication Data

US 2014/0044428 A1 Feb. 13, 2014

Related U.S. Application Data

(63) Continuation-in-part of application No. 13/104,161, filed on May 10, 2011.

(51) Int. Cl.
| | |
|---|---|
| *G03B 17/00* | (2006.01) |
| *G03B 17/56* | (2006.01) |
| *F16M 11/10* | (2006.01) |
| *F16M 11/20* | (2006.01) |
| *F16M 13/00* | (2006.01) |
| *F16M 13/02* | (2006.01) |
| *F16M 11/04* | (2006.01) |

(52) U.S. Cl.
CPC .............. *G03B 17/561* (2013.01); *F16M 11/10* (2013.01); *F16M 11/2021* (2013.01); *F16M 13/00* (2013.01); *F16M 13/02* (2013.01); *F16M 11/041* (2013.01)
USPC .......................................................... 396/419

(58) Field of Classification Search
USPC .................................... 396/419; 24/3.11, 3.12
See application file for complete search history.

(56) References Cited

U.S. PATENT DOCUMENTS

| | | | | |
|---|---|---|---|---|
| 6,021,984 | A * | 2/2000 | Mills | 248/219.4 |
| 6,623,182 | B2 | 9/2003 | Tatera | |
| 7,771,131 | B2 | 8/2010 | Scott | |
| 7,789,574 | B2 | 9/2010 | Broberg | |
| 2005/0164541 | A1* | 7/2005 | Joy et al. | 439/352 |
| 2008/0237282 | A1 | 10/2008 | Sin | |
| 2009/0010637 | A1 | 1/2009 | DeWitt | |
| 2010/0208068 | A1 | 8/2010 | Elsemore | |
| 2010/0215355 | A1 | 8/2010 | Olien | |
| 2011/0222842 | A1 | 9/2011 | Schippers | |

* cited by examiner

*Primary Examiner* — Clayton E Laballe
*Assistant Examiner* — Noam Reisner
(74) *Attorney, Agent, or Firm* — Jansson Munger McKinley & Shape Ltd.

(57) ABSTRACT

A camera mounting bracket system for supporting a camera in a position determined by a user comprising a quick connect/disconnect mounting assemblage which includes a fastener-engaging channel and spring retaining clip for securing the mounting assemblage to a camera whereby the camera is able to be quickly connected/disconnected from the mounting assemblage.

11 Claims, 18 Drawing Sheets

RETAINING CLIP FOR CAMERA MOUNTING BRACKET

RELATED APPLICATION

This application is a continuation-in-part claiming the benefit of application Ser. No. 13/104,161 filed on May 10, 2011, the entire contents of which is incorporated herein by reference.

FIELD

The invention relates to cameras and, more particularly, to the specific mounting of cameras.

BACKGROUND

There are many types of cameras, well-known in the art, which are used for a variety of purposes such as for recreation, security and media-related applications. Depending on the intended use of the camera, it can be advantageous to mount the camera using a variety of hardware options such as a tripod or bracket.

One specific and increasingly popular use for cameras is game animal observation for recreation and/or for scouting in association with hunting activities. Game animal observation or scouting activities can include implementation of scouting cameras for taking photographs, video footage, or other recordings. Use of scouting cameras for game animal observation or scouting is generally known.

Scouting cameras for scouting potential hunting areas and determining game patterns, particularly without disturbing animal activity, are generally well known in the art. Typically, the apparatus includes a film, digital or video camera and a passive infrared sensor (e.g., a motion/heat sensor) that is adapted to sense movement and, in response, activate the camera focused on the area in which the sensor detects movement. Oftentimes, these devices include a delay timer with multiple settings to match specific conditions or locations, thus eliminating unwanted multiple exposures or other non-desired events.

Known scouting cameras are typically set up using some type of mounting bracket. Many such scouting cameras utilize mounting brackets which are cumbersome and complex to set up. It would be advantageous to have a mounting bracket which has a quick connect/disconnect and which provides a camera retaining clip to prevent accidental dislodging of the camera. Once a scouting camera is mounted onto a tree or other flat support surface, a user generally leaves the camera location and returns, frequently or infrequently, to view the images the camera has captured, making the camera a target for theft. Therefore, it would be advantageous to have a mounting bracket with a retaining clip which could also act as a theft deterrent.

SUMMARY

The present device is a camera-mounting bracket system for supporting a scouting camera in a position determined by a user, the bracket comprises a quick connect/disconnect mounting assemblage, the mounting assemblage has an open-ended, elongate fastener-engaging channel for slidably securing a camera thereto, the channel is formed in a bracket member having two opposed elongate edges and an edge at one end joining the two edges, the channel is open at the other end; and a spring retaining clip actuated by the user at the edge-joined end, the clip preventing camera removal without clip actuation. The camera includes at least one fastener for engagement with the channel. The mounting assemblage also includes an anchor member affixable to a tree, building or other non-moveable, permanently-fixed support surface, whereby the camera is able to be quickly connected/disconnected from the mounting assemblage.

In some highly preferred embodiments the bracket system also includes a retaining clip configured such that no clip actuation is required during camera insertion into the channel. It is also preferred that the bracket system include a lock plate with a locking hole. Preferably, the plate is removably attached to the camera prior to camera insertion into the channel and the retaining clip includes a lock hole which is aligned with the locking hole while the camera is engaged in the channel. Both the locking hole and the lock hole are able to accept the shackle of a padlock therethrough.

It is highly preferred that the bracket member and anchor member are pivotally attached. In some preferred embodiments, the anchor member includes a pivot arm defining two fixed rotation axes, the axes being perpendicular to each other, thus allowing the camera to have both pan and tilt adjustability. Preferably, the fastener-engaging channel is formed on the bracket member and the camera includes a plate for engagement with the channel.

In some preferred embodiments, the anchor member includes apertures to affix the mounting assemblage to a tree, building or other support surface. Preferably, the support surface can be a tree, building, stake, pole or a similar support surface which is non-moveable and permanently-fixed. It is also preferred that the support surface such as a stake or pole be secured in the ground.

In other preferred embodiments, the mounting assemblage is a unitary, molded plastic piece. In certain of these and other preferred embodiments, the mounting assemblage includes two slots for securing the bracket to a support surface using a strap.

It is highly preferred that the camera includes a lock mechanism for securing the camera to the mounting assemblage. In some embodiments, the lock mechanism includes a shackle plate with a hole. The bracket member includes a lock plate with a corresponding hole. Both the shackle plate and lock plate accept a shackle of a padlock therethrough. Preferably, the lock mechanism further includes a protective flange positioned to prevent access to the shackle of a padlock with a cutting tool.

These and other aspects of the present device will be better appreciated and understood when considered in conjunction with the following description and the accompanying drawings. It should be understood, however, that the following description, while indicating preferred embodiments of the present device, is given by way of illustration and not of limitation. Many changes and modifications may be made within the scope of the present device without departing from the spirit thereof, and the device includes all such modifications.

DETAILED DESCRIPTION OF PREFERRED EMBODIMENTS

Figure 1:
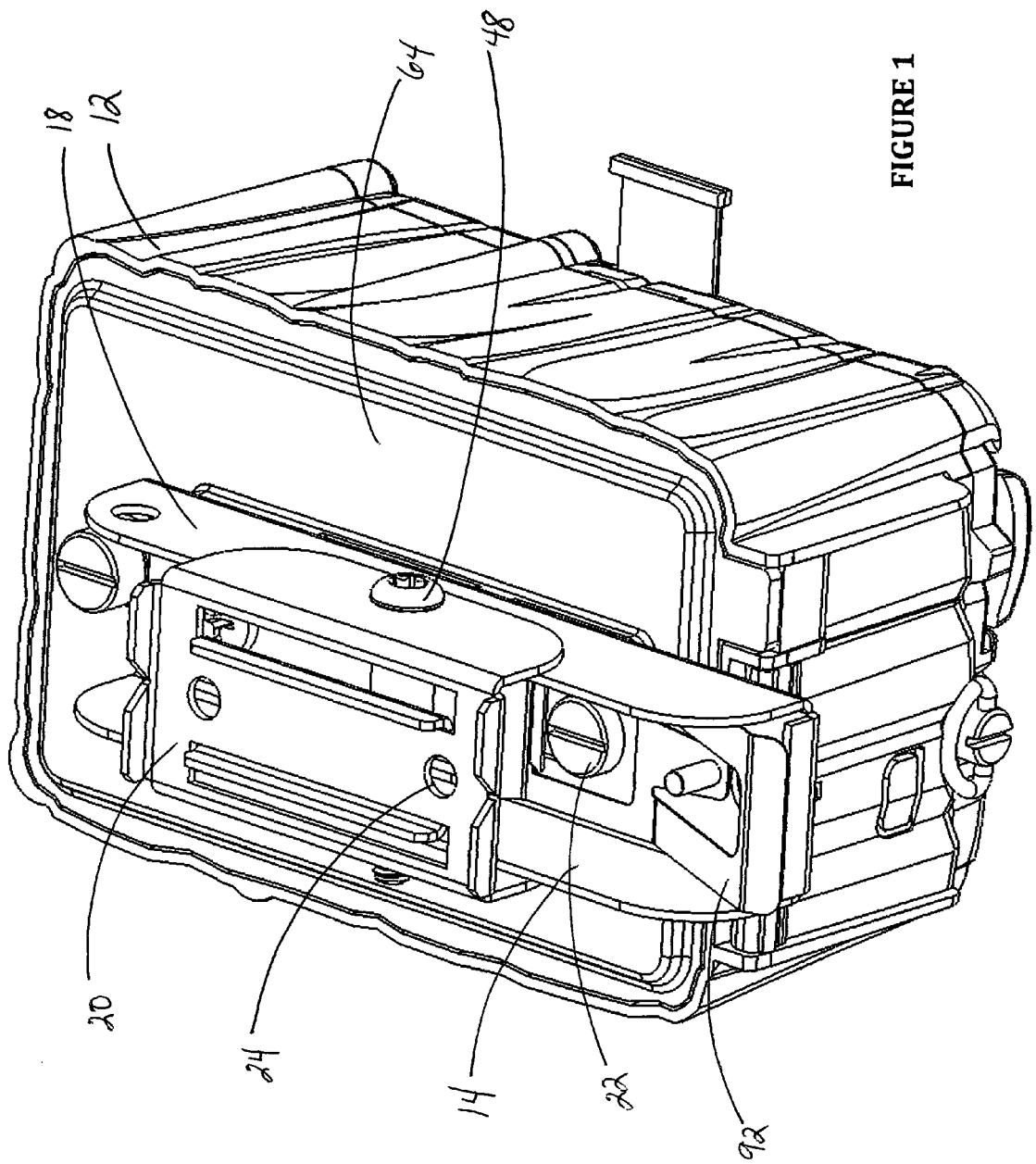
FIG. 1 is a rear elevational view of a first embodiment of a camera-mounting bracket system with mounting assemblage and camera shown in a fully-engaged position.
Figure 2:
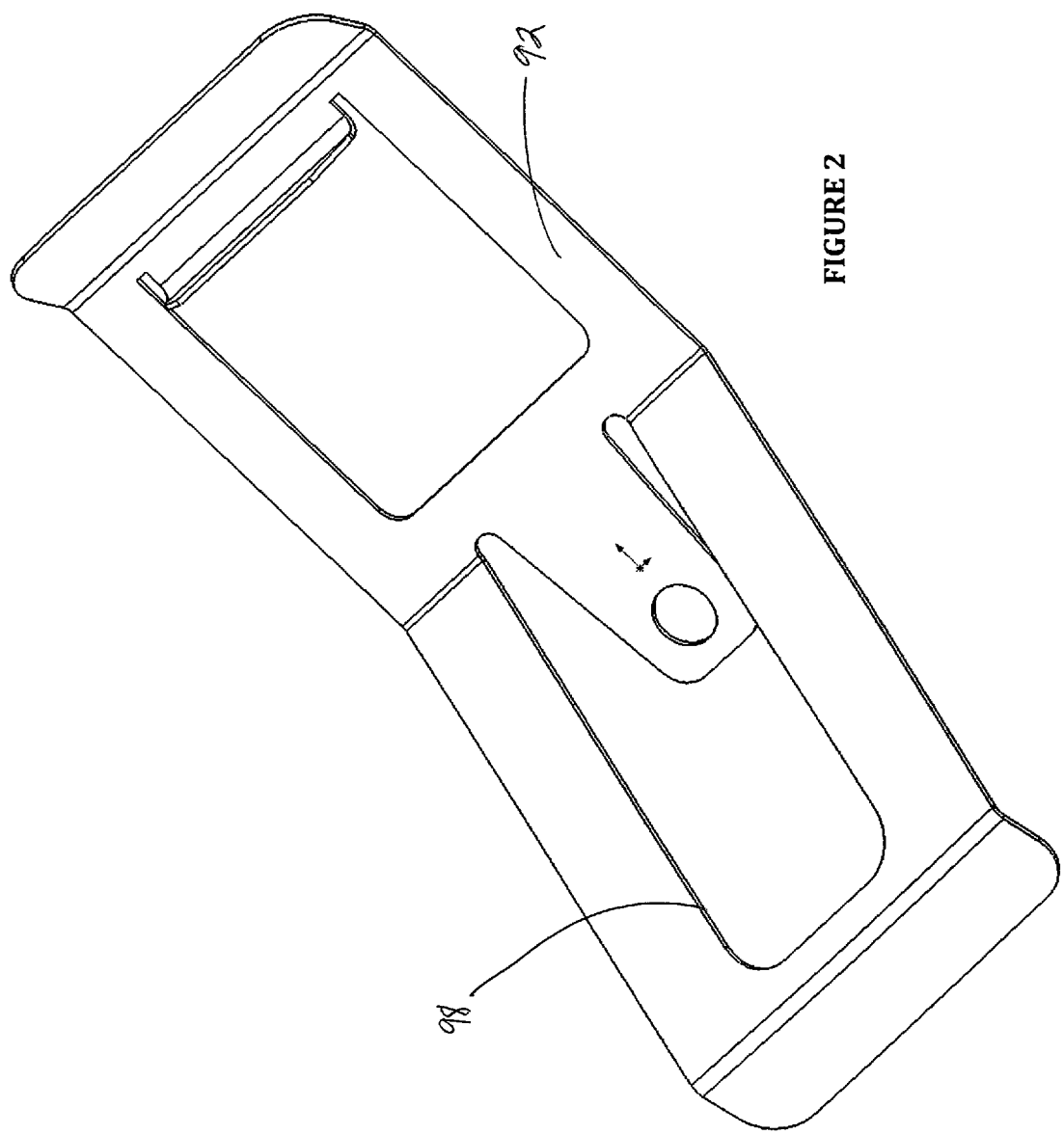
FIG. 2 is a perspective view of the retaining clip of FIG. 1.

With initial reference to FIGS. 1-7, which show a first embodiment of a mounting bracket system 10 for a scouting camera 12, bracket system 10 supports camera 12 in a position determined by a user. The mounting bracket system 10 comprises a quick connect/disconnect mounting assemblage 14 which includes a bracket member 18 and an anchor member 20. Bracket member 18 forms a fastener-engaging channel 16 for slidable securement of camera 12 to mounting assemblage 14 whereby camera 12 is able to be quickly connected/disconnected from mounting assemblage 14. Channel 16 is an open-ended, elongate fastener-engaging channel formed in bracket member 18. Channel 16 has two opposed elongate edges 88 and an edge 90 at one end joining the two edges, channel 16 is open at the other end.

FIGS. 1-7 illustrate that mounting assemblage includes a spring retaining clip 92 actuated by the user at the edge-joined end 90. Clip 92 prevents camera 12 removal without clip actuation. As illustrated by FIGS. 1-2 and 6-7, clip 92 is configured such that no clip actuation is required during camera 12 insertion into channel 16.

Figure 3:
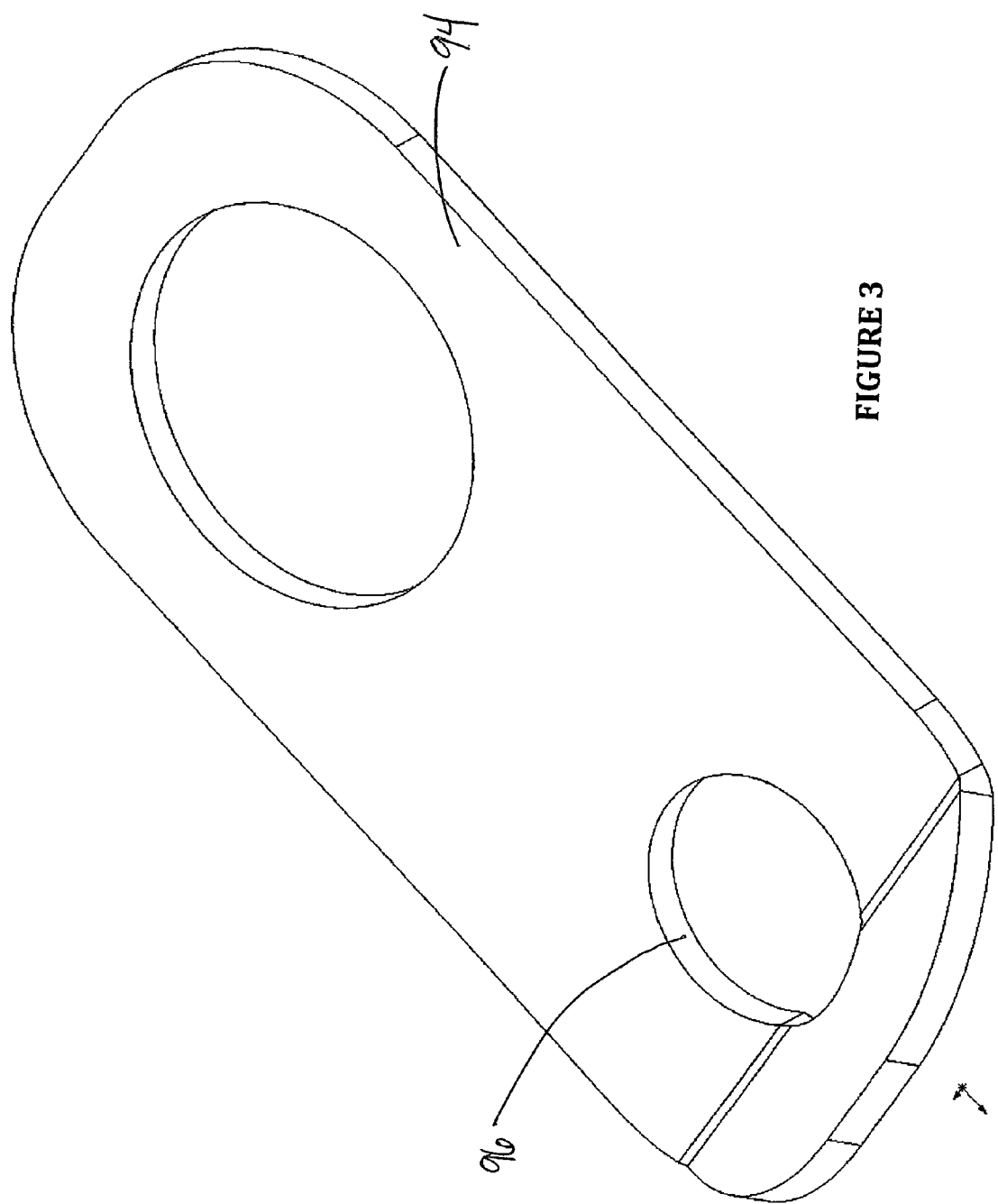
FIG. 3 is a perspective view of the lock plate of FIG. 1.
Figure 4:
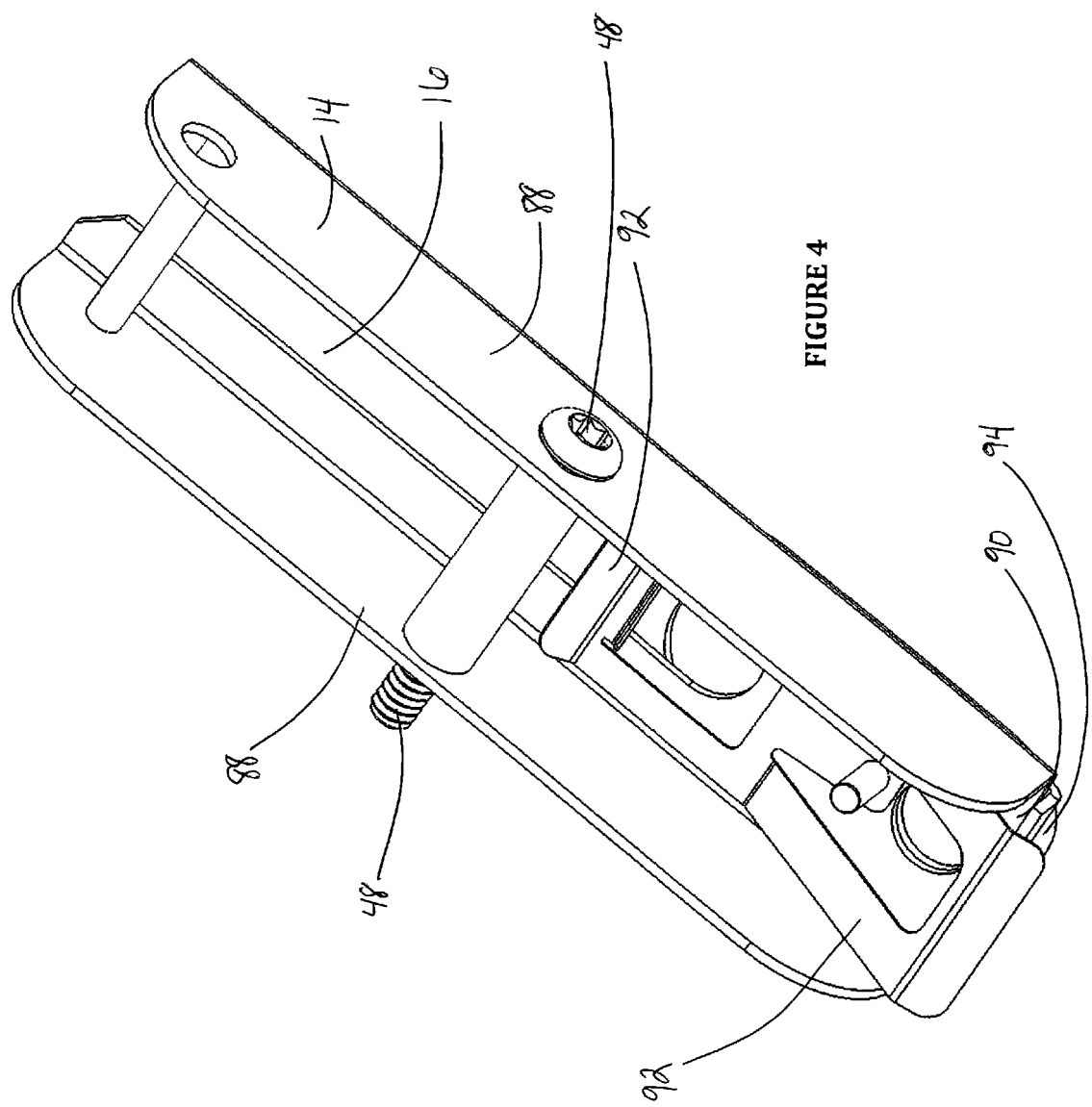
FIG. 4 is a perspective view of the mounting assemblage of FIG. 1 with anchor member removed.
Figure 5:
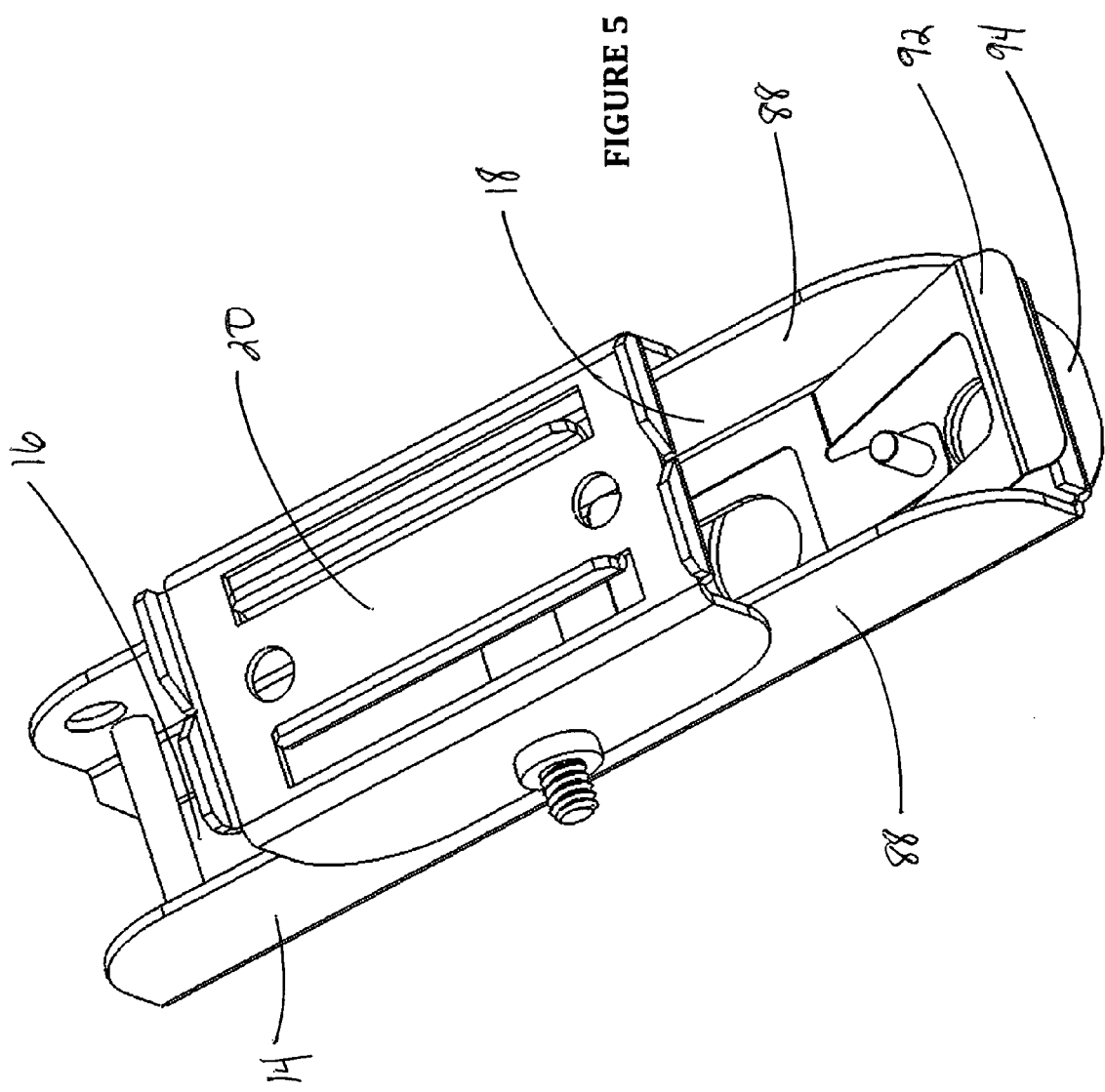
FIG. 5 is another perspective view of the mounting assemblage of FIG. 1.

As seen best in FIGS. 3-5, camera-mounting bracket system 10 includes a lock plate 94 which has a locking hole 96. Lock plate 94 is removably attached to camera 12 prior to camera 12 insertion into channel 16. Clip 92 includes a lock hole 98 which is aligned with the locking hole 96 while camera 12 is engaged in channel 16. This allows both the locking hole 96 and lock hole 98 to accept a shackle 82 of a padlock 84 therethrough.

Figure 6:
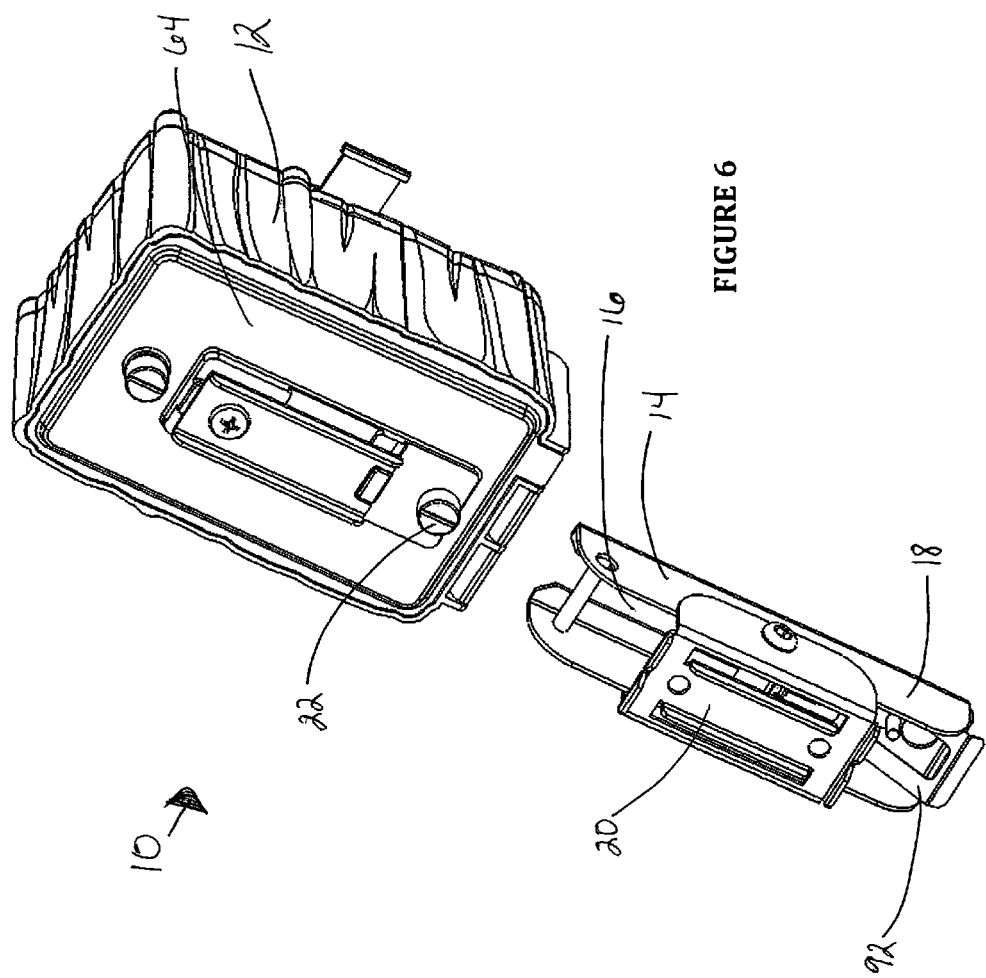
FIG. 6 is a rear elevational view of the camera-mounting bracket system of FIG. 1 with mounting assemblage and camera shown in a disengaged position.
Figure 7:
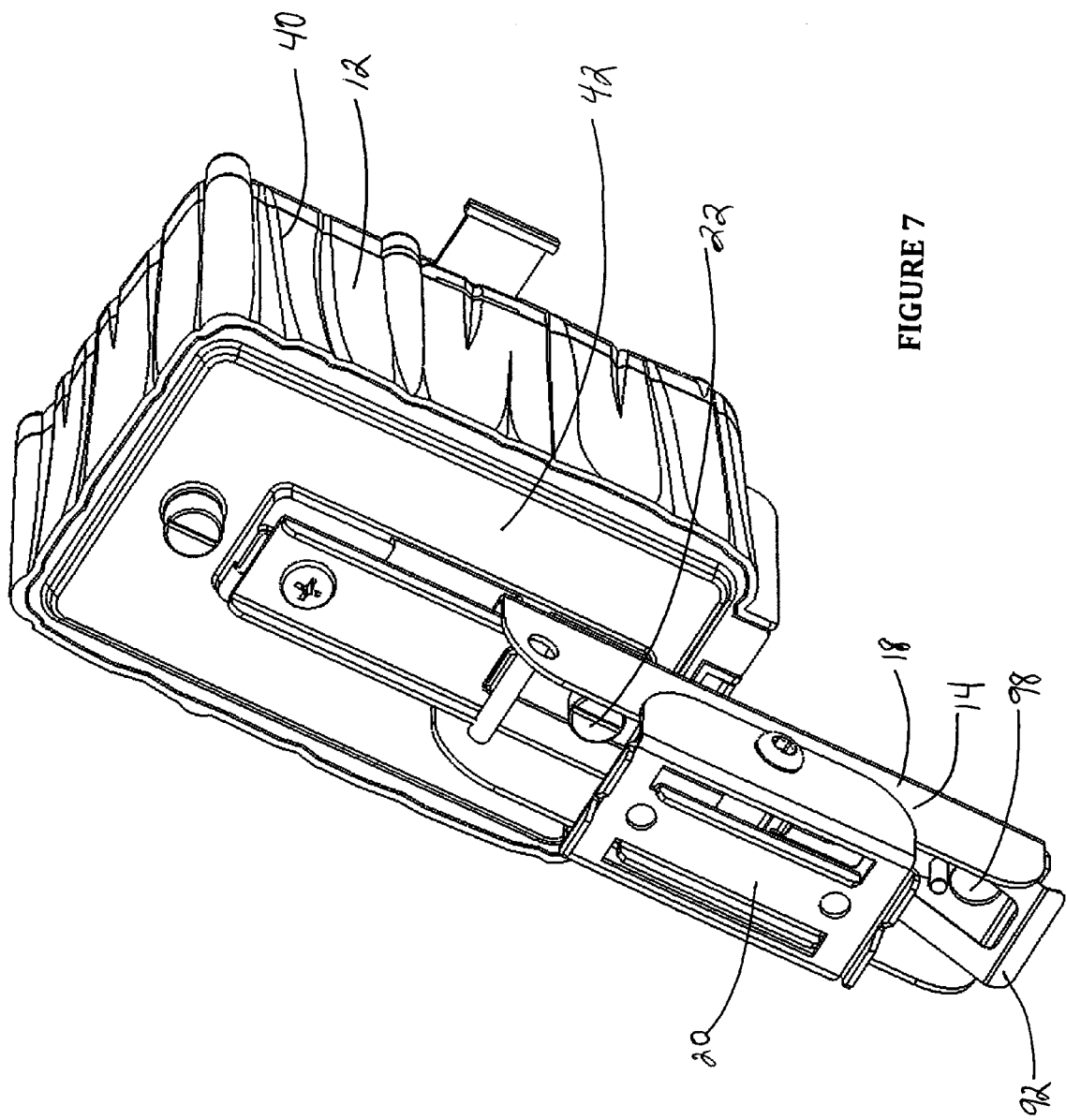
FIG. 7 is another rear elevational view of the camera-mounting bracket system of FIG. 1 with mounting assemblage and camera shown in a partially-engaged position.

FIGS. 6-7 illustrate the slideable interaction and engagement between channel 16 and camera 12. As seen in FIG. 7, channel 16 on bracket member 18 slides onto one or several fasteners 22 on the back of camera 12. At least one of fasteners 22 preferably also serves for temporarily holding and securing camera cover 42 against camera main body 40. As channel 16 slides up along fasteners 22 on camera 12 retaining clip 92 engages the fasteners 22 and holds camera 12 in place in channel 16. Clip 92 actuation is not required during camera insertion into channel 16. Clip 92 actuation (which consists of user depressing spring portion of clip 92) is only required when camera 12 is removed from channel 16.

FIGS. 10 and 12-14 specifically illustrate that anchor member 20 is affixable to a tree, building or other non-moveable, permanently-fixed support surface and that camera 12 is able to be quickly connected/disconnected from mounting assemblage 14.

FIGS. 8-9 and 17-18, which show a second embodiment of mounting assemblage 14, illustrate that camera 12 includes a main body 40 and a cover 42 (at the back wall 64 of camera 12) that are joined together with a hinge at a top portion of main body 40. Fasteners 22 (see FIG. 8) in this embodiment are located at the bottom portion of back wall 64 of main body 40, and act to secure camera 12 to bracket 18 along the opposite edges of channel 16.

Fastener-engaging channel 16 in some embodiments, is a key-hole shape (not shown) instead of a channel 16 as shown in the figures. Fastener-engaging channel 16, when in the key-hole shape configuration, allows the head of fastener 22 to fit into the round portion (at the top of the hole) and then allows the fastener to slide down and lock into place. In this configuration, two or more key-holes are preferable to secure camera 12. Fastener-engaging channel 16 can be modified further to include a key-hole shape and a slot (not shown). Other similar configurations different from a straight channel 16 as shown in the figures may be used.

As illustrated best in FIGS. 1, 5 and 8-9, bracket member 18 and anchor member 20 are pivotally attached by a screw 48 or the like. Anchor member 20 includes apertures 24 (one or many apertures 24 can be part of anchor member 20) to affix mounting assemblage 14 to a tree 26, building or other support surface. (FIG. 10 illustrates a third embodiment with anchor member 20 affixed to a tree.) Mounting assemblage 14 can be affixed to any support surface on which it would be preferable to mount a camera.

Figure 8:
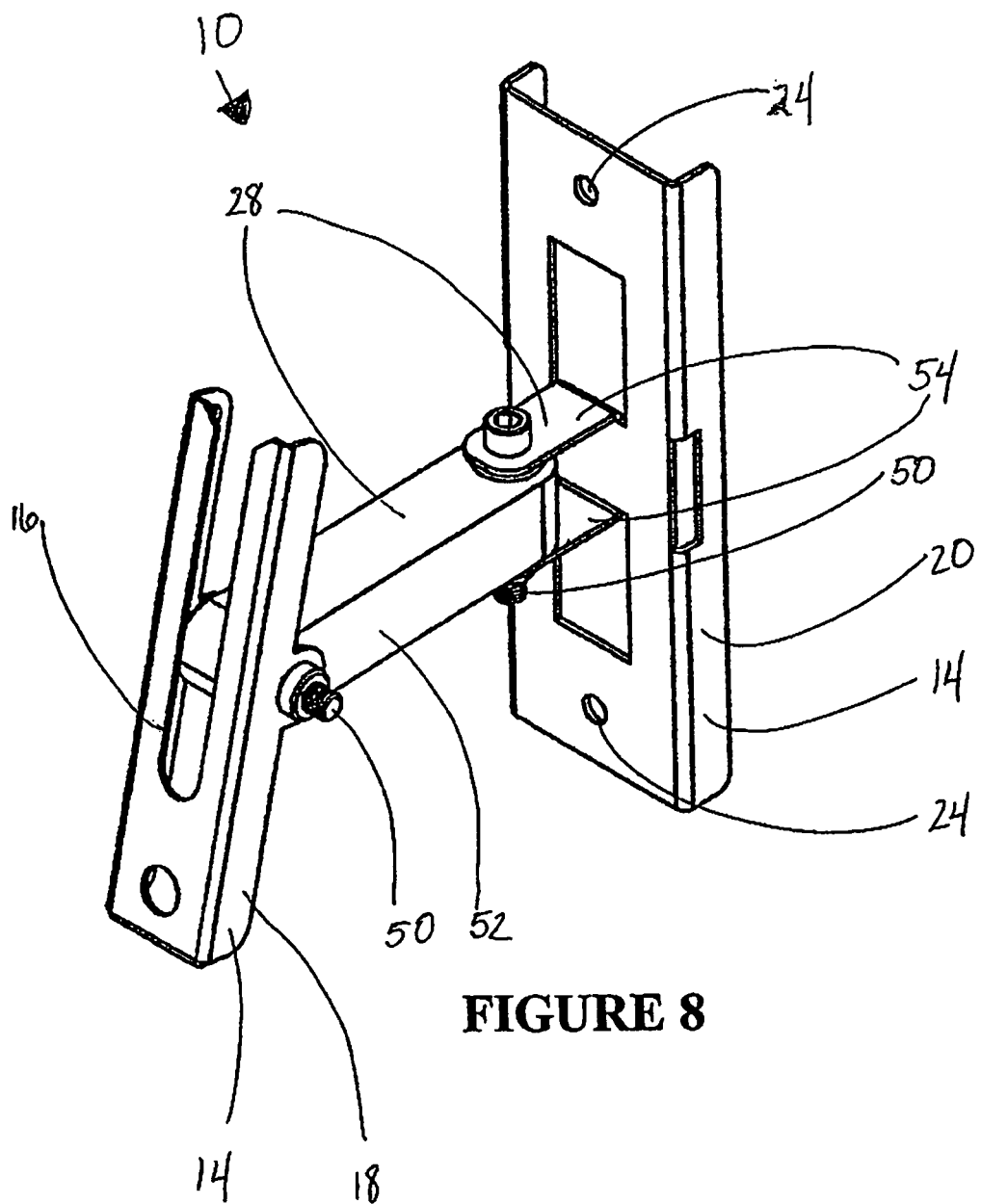
FIG. 8 is a front perspective view of a second embodiment of a camera-mounting bracket system.
Figure 9:
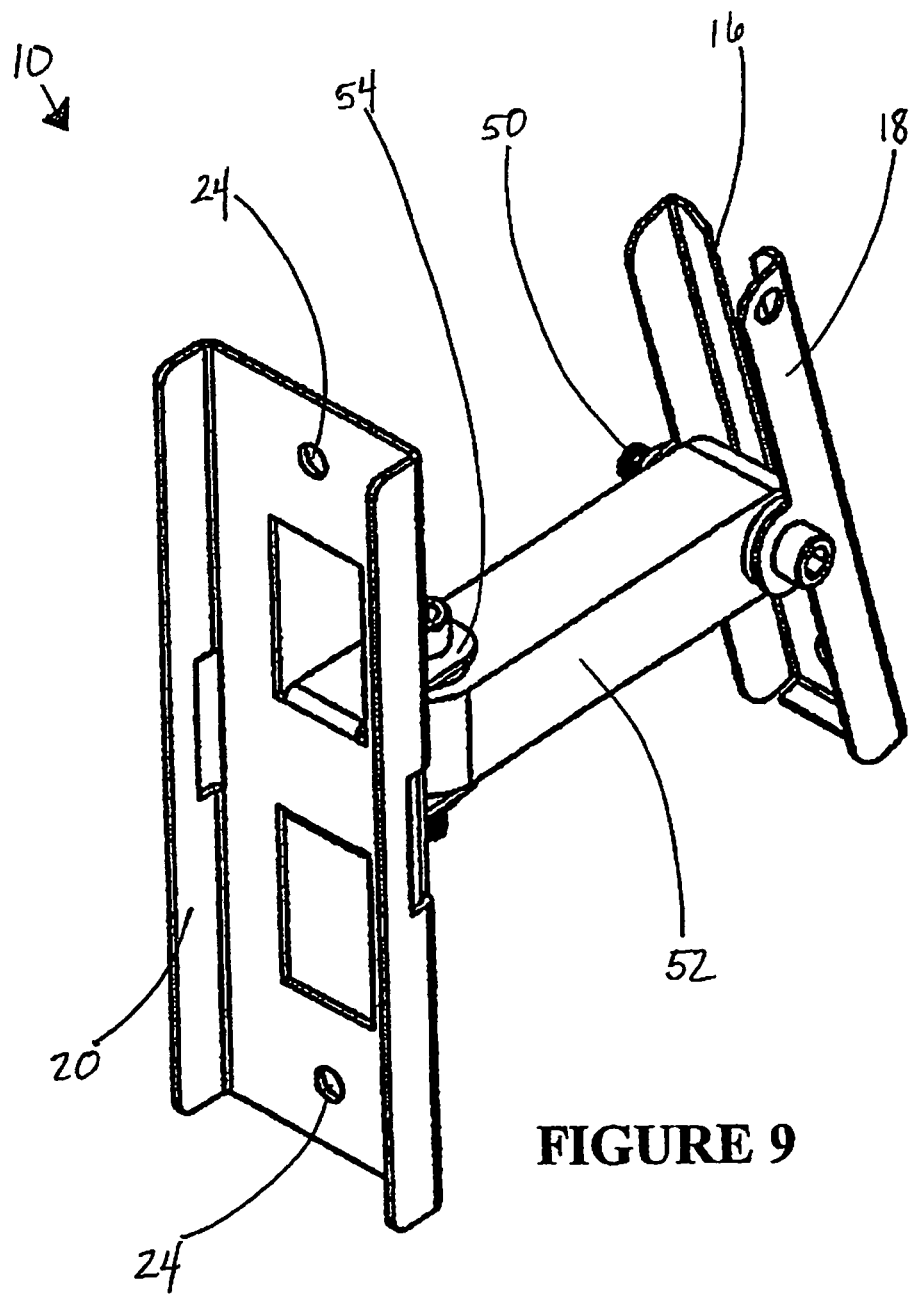
FIG. 9 is a back perspective view of the mounting bracket of FIG. 8.
Figure 10:
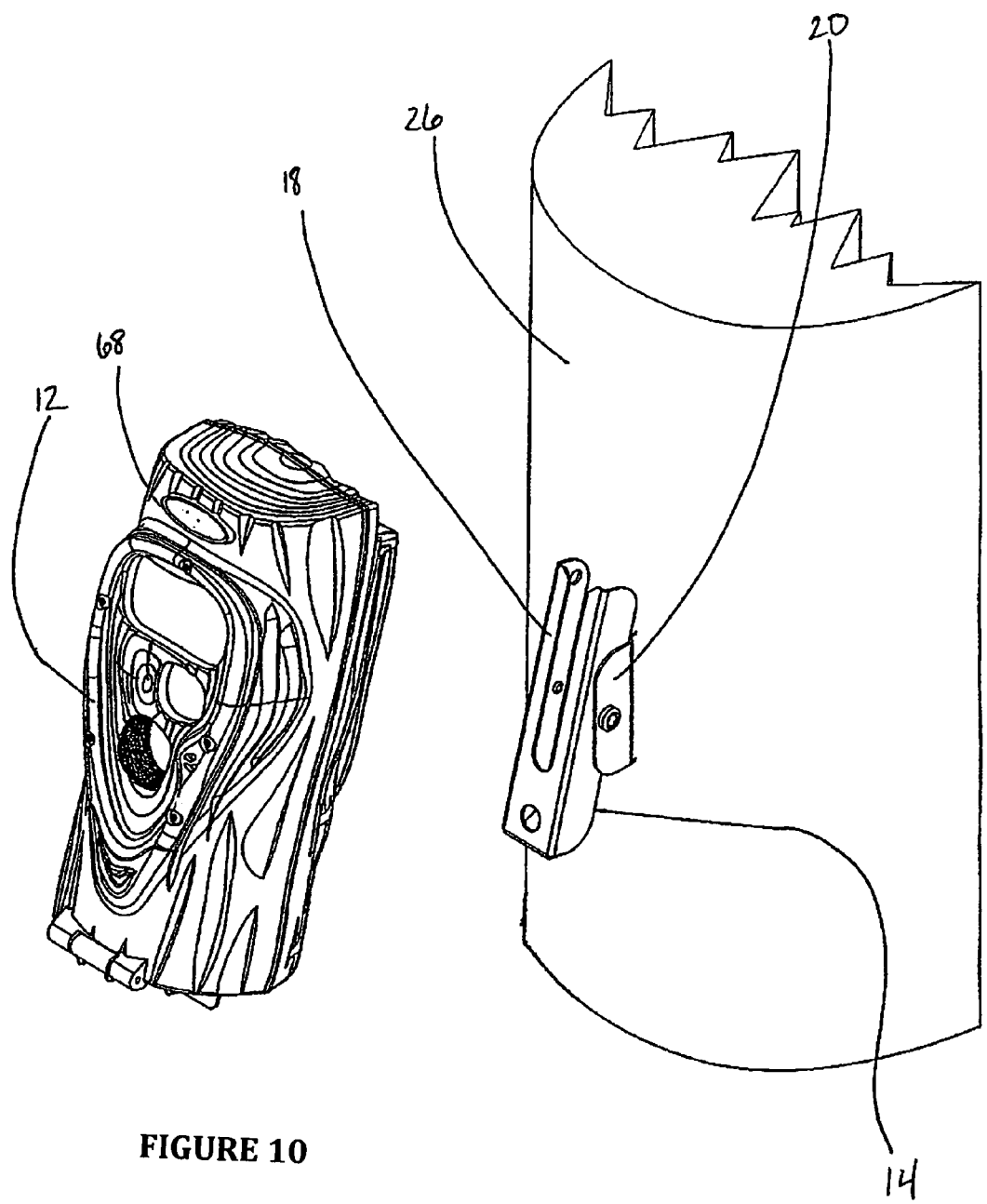
FIG. 10 is a perspective view of a third embodiment of a camera-mounting bracket system attached to a tree with camera shown.
Figure 11:
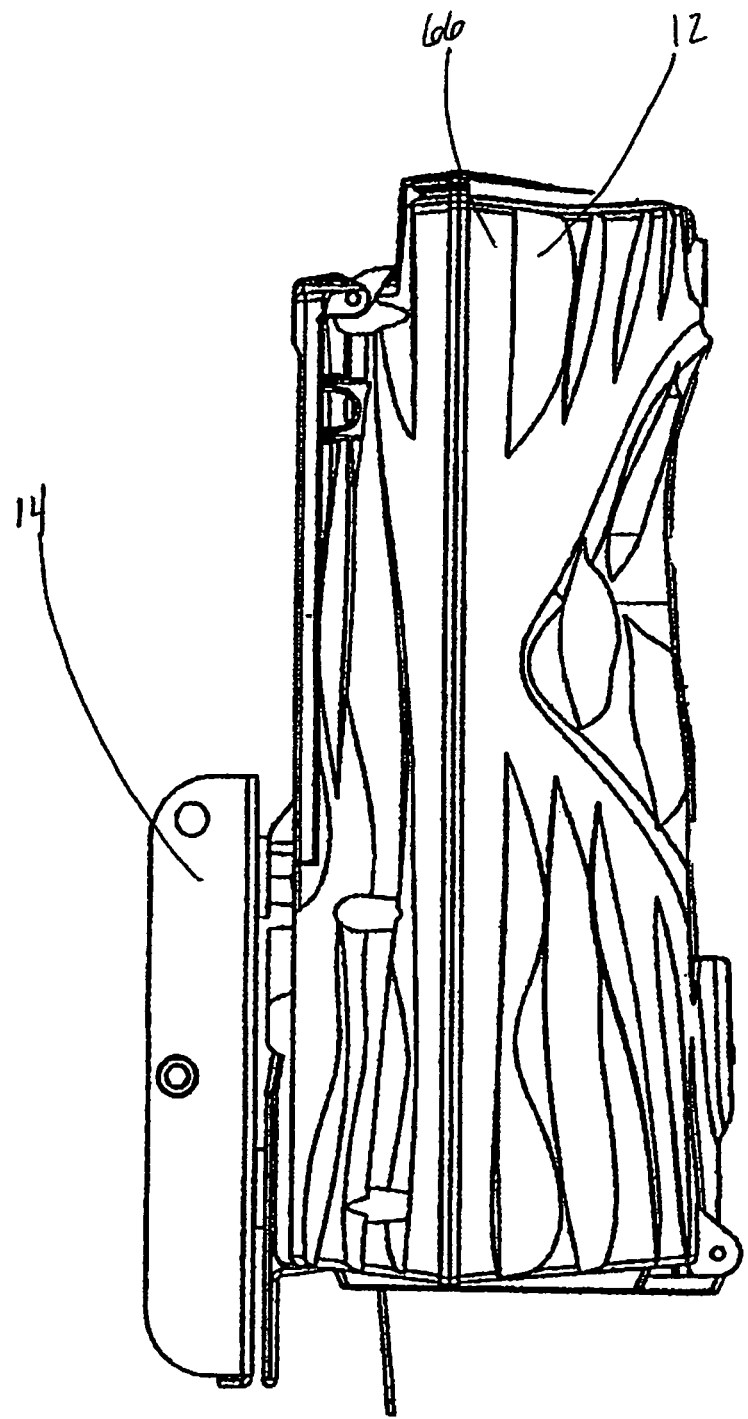
FIG. 11 is a side view of the mounting assemblage of FIG. 10 attached to a camera with anchor member removed.

FIGS. 8-9 further illustrate the second embodiment of mounting assemblage 14. Second embodiment, like the first embodiment, includes mounting assemblage 14 with two portions, a bracket member 18 and an anchor member 20. A fastener-engaging channel 16 is formed on bracket member 18, and camera 12 includes fasteners 22 for slidable engagement with channel 16. In the second embodiment, anchor member 20 includes a pivot arm 52 which defines two fixed pivot axes at its opposite ends. Pivot axes are substantially perpendicular to each other. These pivot axes give camera 12 both pan and tilt adjustability.

As shown in FIGS. 8-9, at least one screw 50 connects bracket member 18 to pivot arm 52 at a pivot axis. A second screw 50 connects pivot arm 52 to pivot supports 54 of the main part of anchor member 20, as shown best in FIG. 8. Pivot supports 54 are bent outwardly from, and integral with, the main part of anchor member 20 at about 90° thereto. Axes and screws 50 enable pivot arm 52 to provide both pan and tilt ability for camera 12, and screws 50 allow camera 12 to be fixed in a desired orientation. In other words, when camera 12 is secured to bracket member 18, camera 12 can be oriented by a user in numerous directions given the pan and tilt ability of mounting assemblage 14. FIGS. 8 and 9 illustrate that the main portion of anchor member 20 includes apertures 24 for securing mounting assemblage 14 to a support structure through the use of screws or the like.

Figure 16:
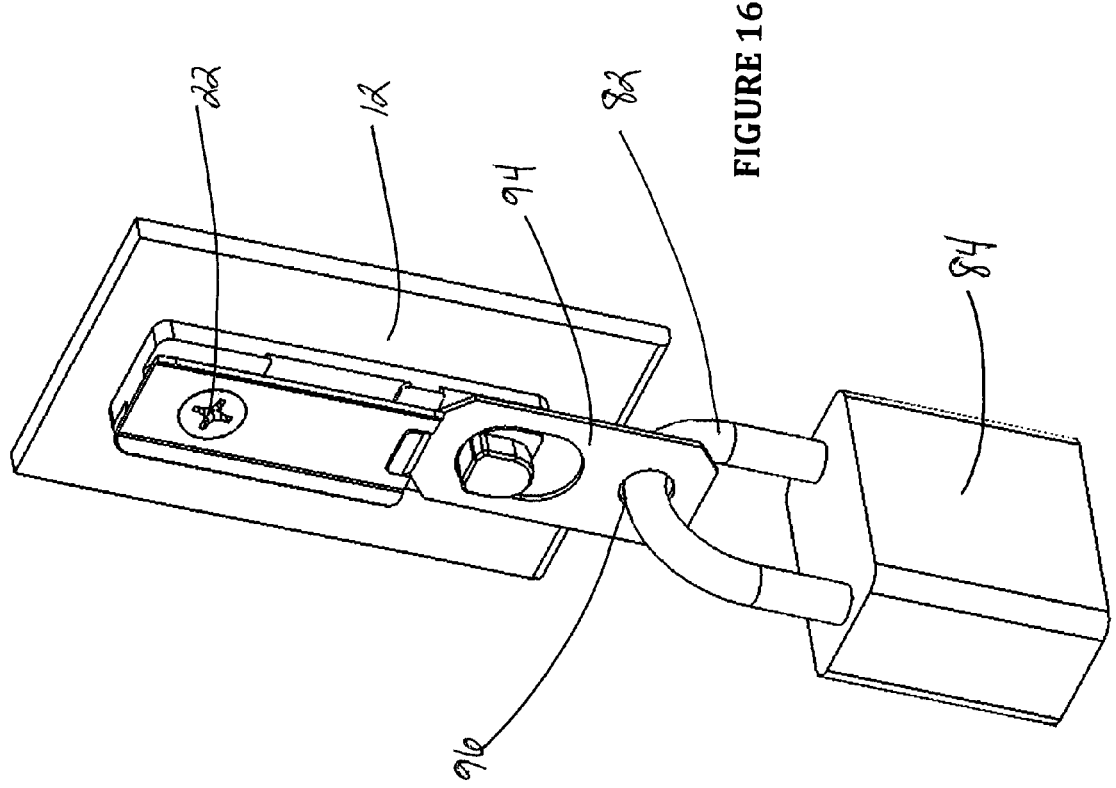
FIG. 16 is a partial view of the first embodiment showing the back plate of the camera in engagement with the lock plate and including a padlock.

A first lock mechanism for camera securement is seen in FIG. 16. FIG. 16 illustrates a lock plate 94 which has locking hole 96. Locking hole 96 interacts with fastener 22 on camera 12. Shackle 82 of a padlock 84 can be placed through locking hole 96 for securement purposes. (Note that FIG. 16 only shows back plate of camera 12, not a complete camera.) When in use, lock plate 94 is sandwiched between camera 12 and mounting assemblage 14 such that locking hole 96 aligns with lock hole 98 on clip 92 (see FIGS. 4-5). This allows shackle 82 of padlock 84 to be placed through both locking hole 96 and lock hole 98.

Figure 17:
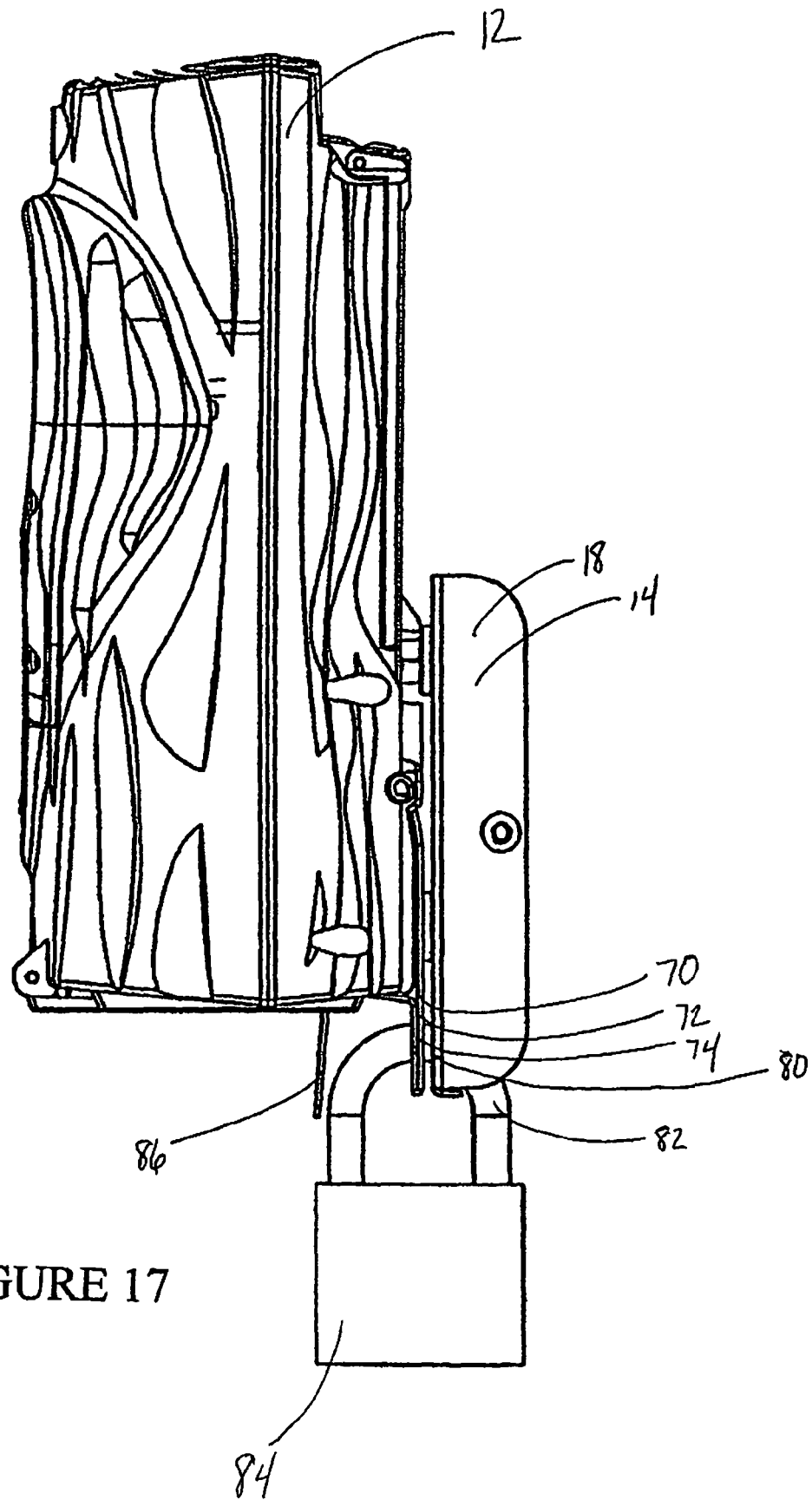
FIG. 17 is a side view of the mounting assemblage of FIG. 8 illustrating the lock mechanism with a padlock.
Figure 18:
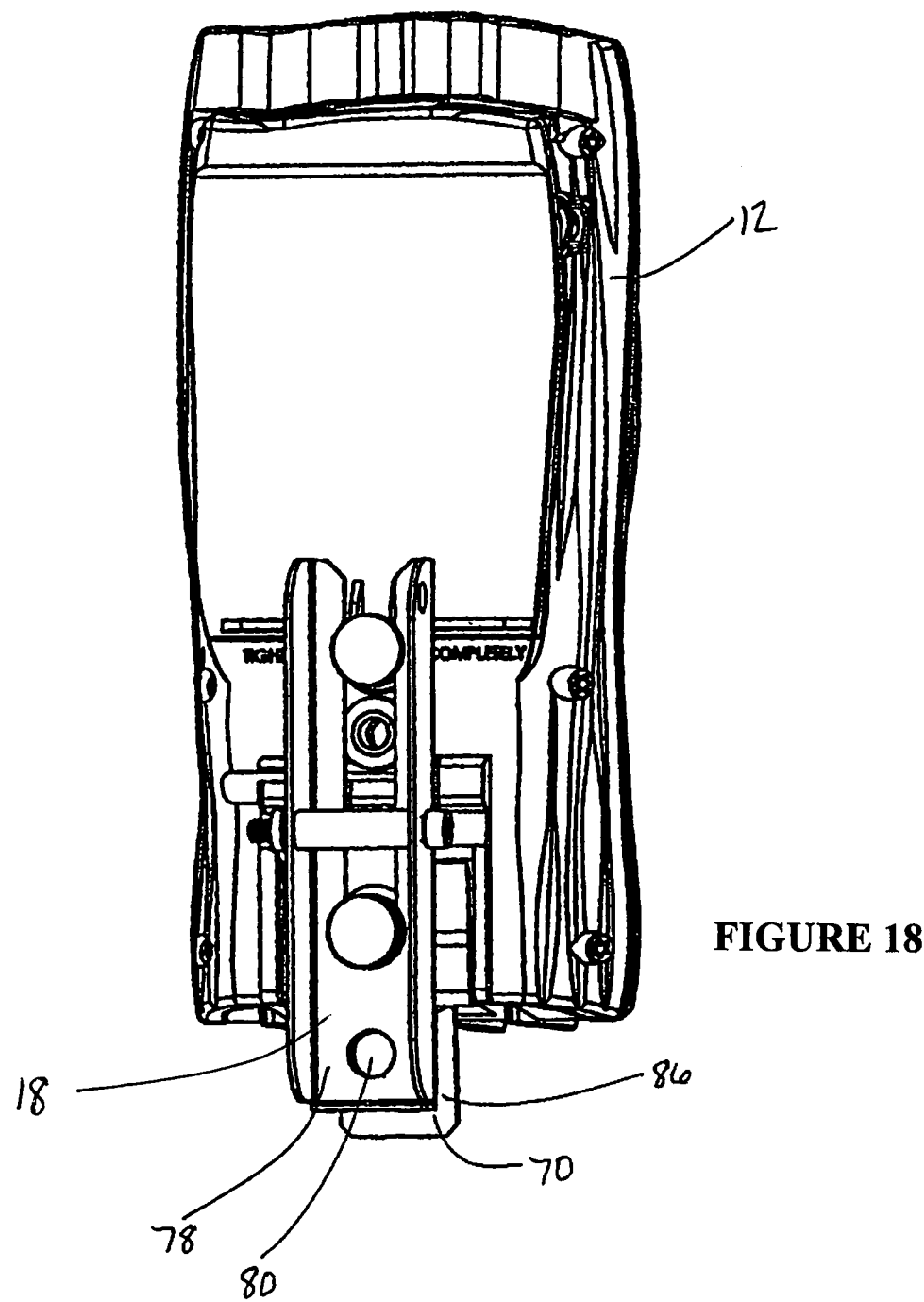
FIG. 18 is a rear elevational view of the mounting assemblage of FIG. 8 illustrating the lock mechanism with a padlock.

FIGS. 17-18 illustrate that camera 12 can include a second lock mechanism 70 for securing camera 12 to mounting assemblage 14 and that lock mechanism 70 includes a shackle plate 72 with a hole 74. Bracket member 18 includes a lock plate portion 78 near the lower end thereof with a corresponding hole 80. Both shackle plate 72 and lock plate portion 78 accept a shackle 82 of a padlock 84 therethrough. FIG. 17 illustrates that lock mechanism 70 further includes a protective flange 86 positioned to prevent access to the shackle 82 of a padlock 84 with a cutting tool, such as a bolt cutter (not shown).

Figure 12:
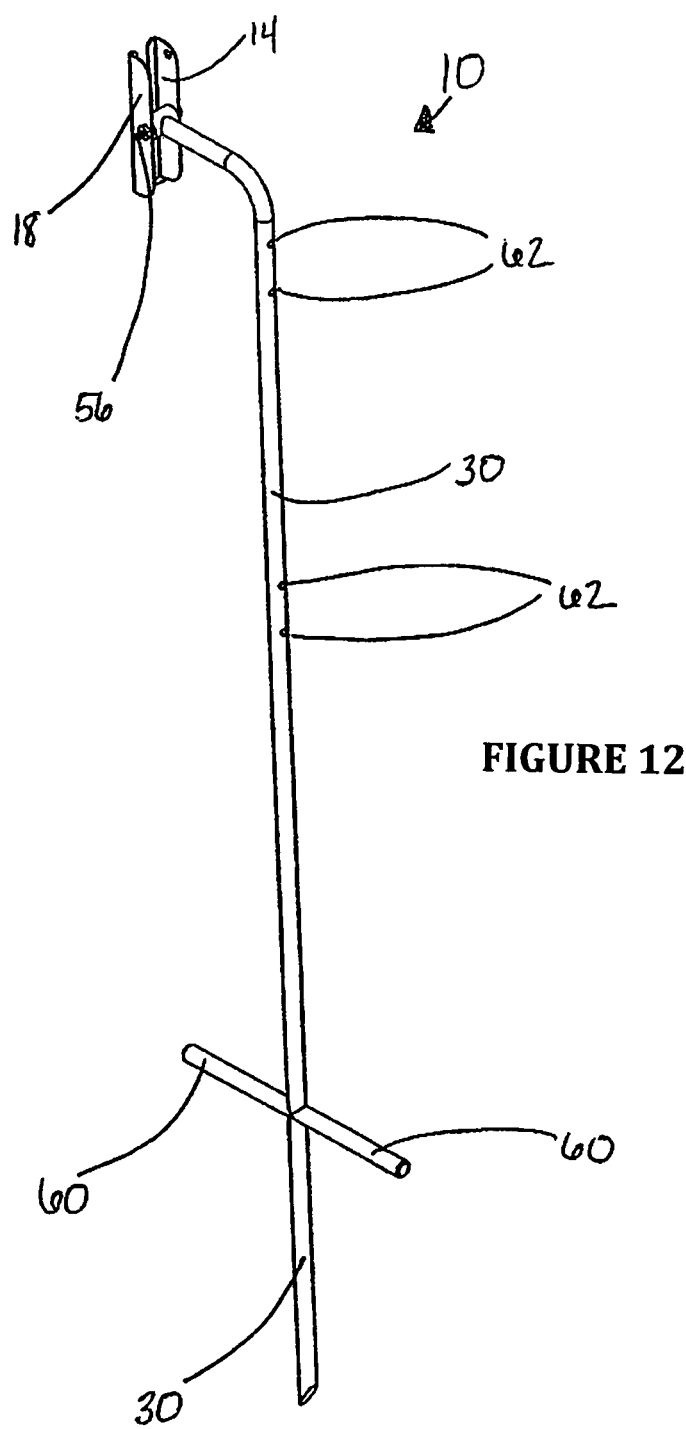
FIG. 12 is a perspective view of a fourth embodiment of a camera-mounting bracket system affixed to a support structure.
Figure 13:
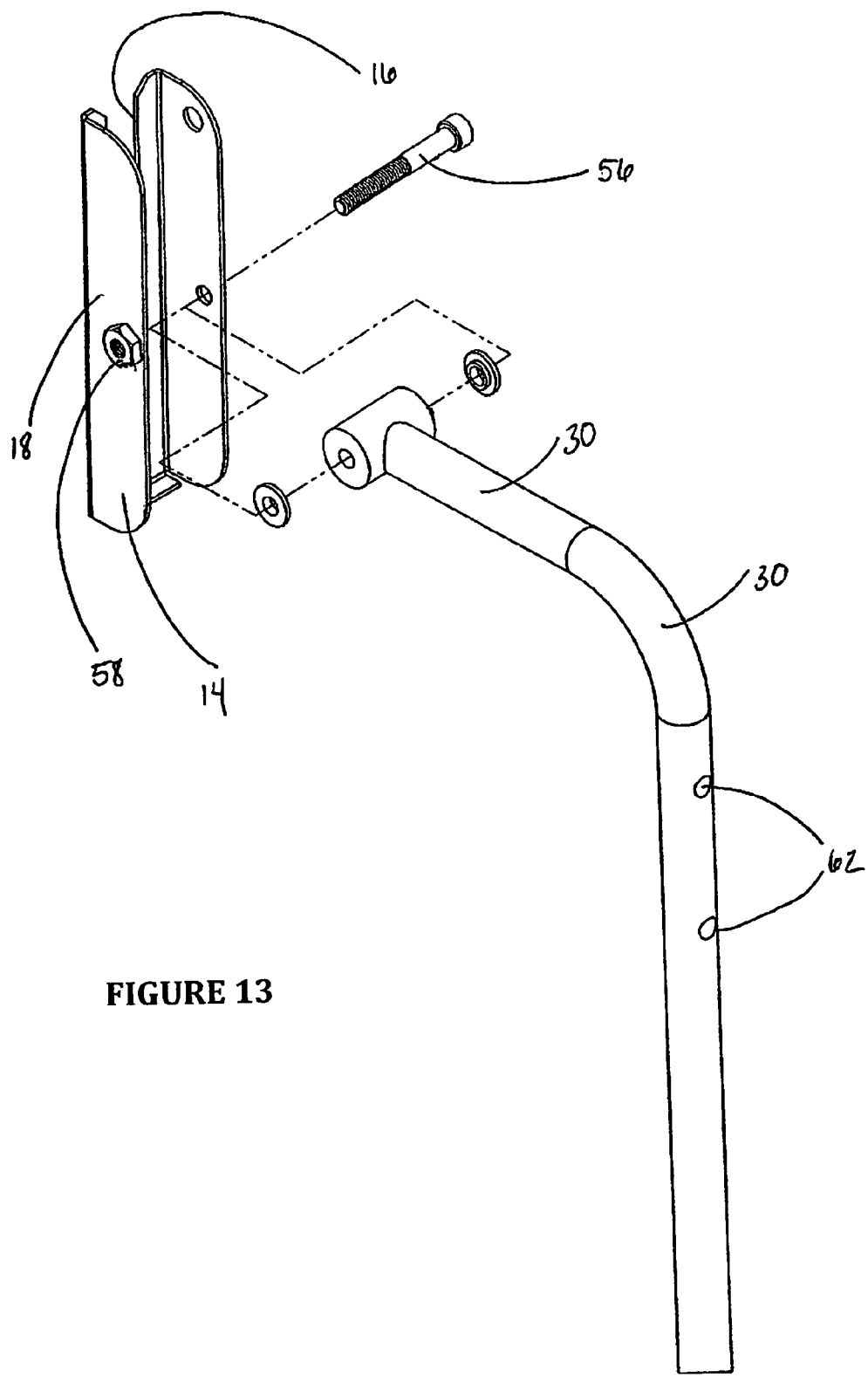
FIG. 13 is an exploded view of the mounting assemblage of FIG. 12.
Figure 14:
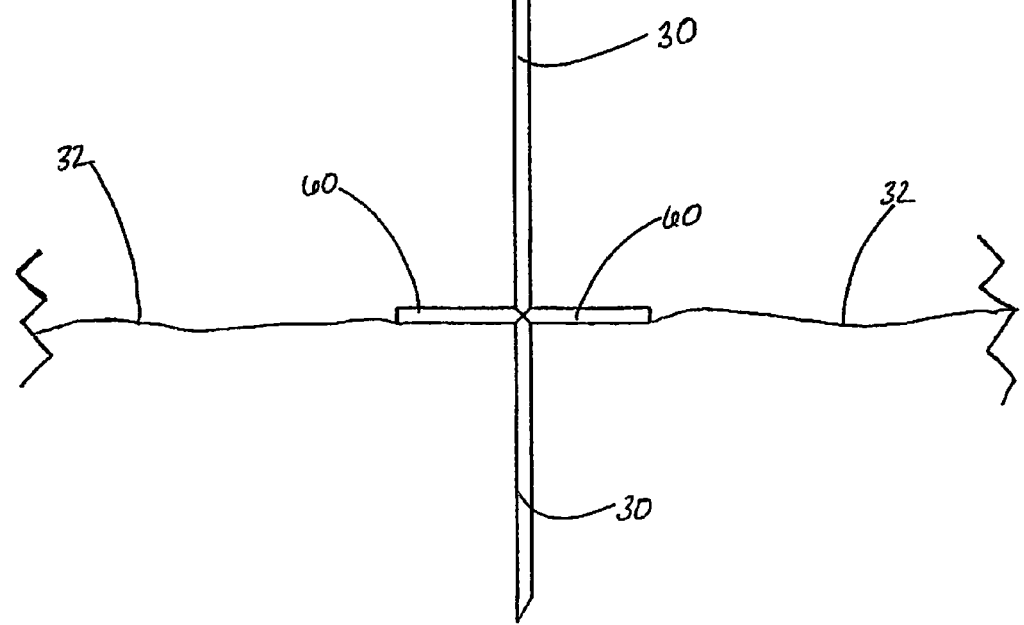
FIG. 14 is a side view of the mounting assemblage of FIG. 12.

FIGS. 12-14 illustrate a fourth embodiment of mounting assemblage 14. In this embodiment, mounting assemblage 14 consists of bracket member 18 as a unitary structure. Bracket member 18 is secured to a stake or pole 30 (which acts as a support surface) through the use of a threaded screw 56 with nut 58 (or similar securement structure). This allows bracket member 18 to pivot with respect to the stake or pole 30.

As noted above, the support surface can be a stake or pole 30 as shown in FIGS. 12-14. If the support surface is a stake or pole 30, stake or pole 30 should be secured in the ground 32 as seen in FIG. 14. Stake or pole 30 can also include a step bar 60 for easy insertion of stake or pole 30 into ground 32. Stake or pole 30 may also include holes 62 so that stake or pole 30 can alternatively be directly mounted to a support surface such as a tree.

Figure 15:
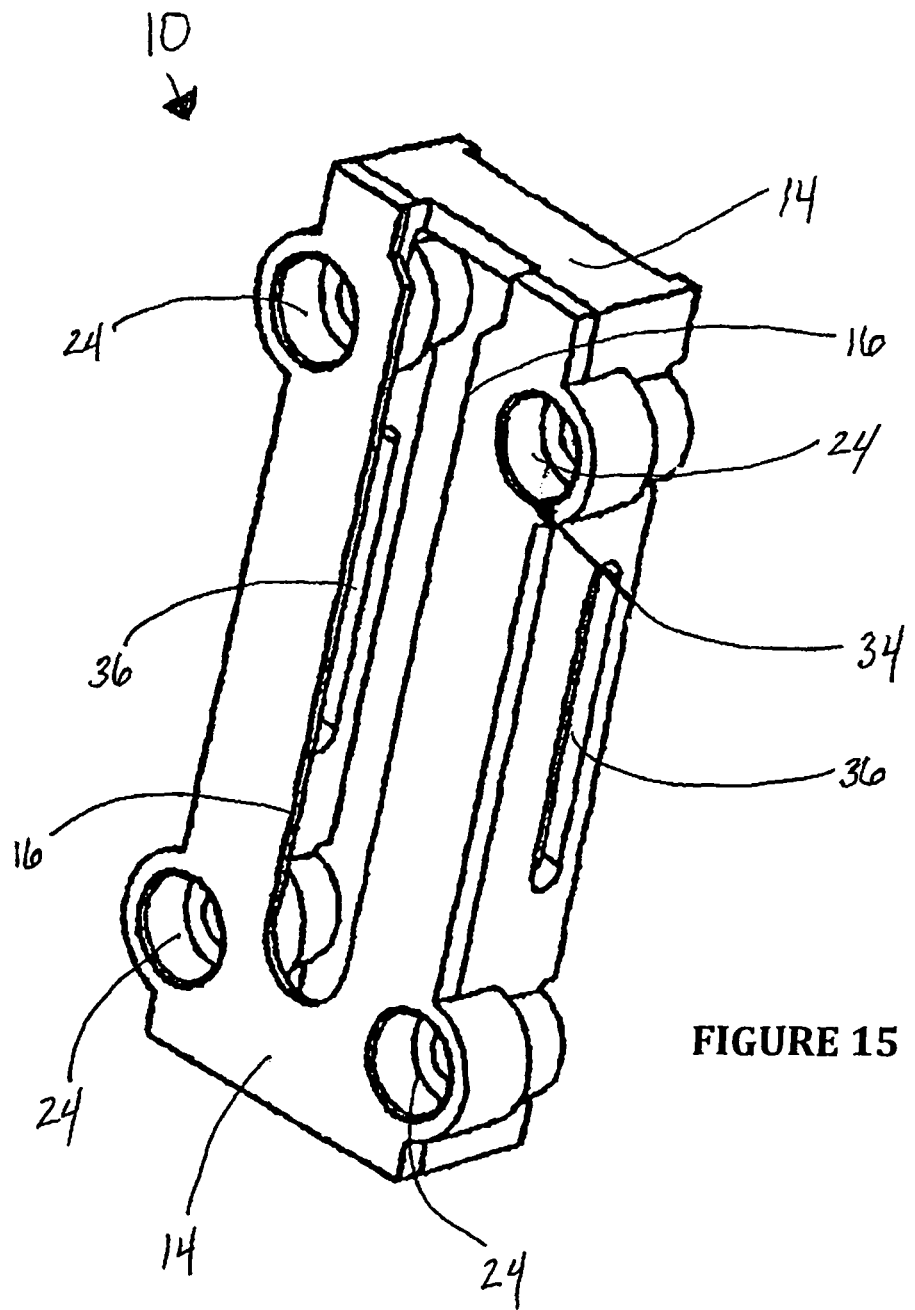
FIG. 15 is a perspective view of a fifth embodiment of a camera-mounting bracket system.

FIG. 15 shows a fifth embodiment which includes mounting assemblage 14 as a unitary, molded-plastic piece 34. In this embodiment, mounting assemblage 14 is injection molded. In this embodiment, mounting assemblage 14 includes two slots 36 for engagement with a strap (not shown) for securement to a support surface. Mounting assemblage 14 in this embodiment also includes apertures 24 for alternative or additional securement to a support surface such as a tree.

Some embodiments of this application describe a mounting assemblage 14 which is preferably made of powder-coated metal. Stake or pole 30 in the fourth embodiment is also preferably made of metal; however, an acceptable alternative such as wood may also be used.

It should be noted that FIGS. 1-18 illustrate camera 12 which is a scouting camera. However, the mounting assembly of this application can be used on a variety of types of cameras (such as for recreation, security or media-related purposes) and is not limited to scouting cameras. As shown in the figures, main body 40 of camera 12 is typically a box-like enclosure that has a back wall 64, multiple sidewalls 66 extending therefrom, and a front wall 68. Front wall 68 generally holds an infrared illuminator, a camera window, and a sensor, such as a heat-in-motion sensor (see generally the figures).

While the principles of this invention have been described in connection with specific embodiments, it should be understood clearly that these descriptions are made only by way of example and are not intended to limit the scope of the invention.

The invention claimed is:

1. A camera-mounting bracket system for supporting a scouting camera in a position determined by a user, the bracket comprising a quick connect/disconnect mounting assemblage, the mounting assemblage having:
   an open-ended, elongate fastener-engaging channel for slidably securing a camera thereto, the channel being formed in a bracket member having two opposed elongate edges and an edge at one end joining the two edges, the channel being open at the other end; and
   a spring retaining clip actuated by the user at the edge-joined end, the clip preventing camera removal without clip actuation;

the camera including fasteners for engagement with the channel, the mounting assemblage further having an anchor member affixable to a tree, building or other non-moveable, permanently-fixed support surface and a lock plate having a locking hole, the plate being removably attached to the camera prior to camera insertion into the channel, the retaining clip including a lock hole which is aligned with the locking hole while the camera is engaged in the channel, whereby both the locking hole and the lock hole accept a shackle of a padlock therethrough and the camera is able to be quickly connected/disconnected from the mounting assemblage.

2. The camera-mounting bracket system of claim 1 further including a retaining clip configured such that no clip actuation is required during camera insertion into the channel.

3. The camera-mounting bracket system of claim 1 wherein the bracket member and anchor member are pivotably attached to one another.

4. The camera-mounting bracket system of claim 1 wherein the anchor member includes apertures to affix the mounting assemblage to the tree, building or other non-moveable, permanently-fixed support surface.

5. The camera-mounting bracket system of claim 1 wherein the anchor member includes a pivot arm defining two fixed rotation axes, the axes being substantially perpendicular to each other, whereby the camera has both pan and tilt adjustability.

6. The camera-mounting bracket system of claim 5 wherein the fastener-engaging channel is formed on the bracket member and the camera includes fasteners for engagement with the channel.

7. The camera-mounting bracket system of claim 5 wherein the fastener-engaging channel is formed on the bracket member and the camera includes a plate for engagement with the channel.

8. The camera-mounting bracket system of claim 5 wherein the anchor member includes apertures to affix the mounting assemblage to the support surface.

9. The camera-mounting bracket system of claim 8 wherein the support surface is a tree.

10. The camera-mounting bracket system of claim 1 wherein the bracket member is affixed to a stake or pole.

11. The camera-mounting bracket system of claim 10 wherein the stake or pole is securable to the ground.

* * * * *